United States Patent

Lan

Patent Number: 6,047,166
Date of Patent: Apr. 4, 2000

[54] GAIN STRUCTURE OF ANTENNAE OF MOBILE PHONES

[76] Inventor: Chih Hung Lan, 6/Fl., No. 42, Yen-Shou St., Sung-Shan, Ward, Taipei, Taiwan

[21] Appl. No.: 09/045,802

[22] Filed: Mar. 23, 1998

[51] Int. Cl.⁷ ..................................................... H04B 1/38
[52] U.S. Cl. ............................. 455/90; 455/129; 343/702
[58] Field of Search ............................. 455/90, 351, 349, 455/347, 348, 346, 89, 128, 129; 343/702, 906

[56] References Cited

U.S. PATENT DOCUMENTS

| | | | |
|---|---|---|---|
| 5,243,355 | 9/1993 | Emmert et al. | 343/702 |
| 5,691,730 | 11/1997 | Egashira et al. | 343/702 |
| 5,764,191 | 6/1998 | Tsuda | 343/702 |
| 5,836,005 | 11/1998 | Chang | 343/702 |
| 5,900,839 | 5/1999 | Dupperay | 343/702 |
| 5,929,815 | 7/1999 | Elderfield | 343/702 |

*Primary Examiner*—Wellington Chin
*Assistant Examiner*—Congvan Tran
*Attorney, Agent, or Firm*—Rosenberg, Klein & Lee

[57] ABSTRACT

A gain structure of antennae of mobile phones including a retractable antenna, an antenna clamping pawl tube element, a connecting fastening ring, and an outer tube. The connecting fastening ring is a double-sleeve tubular element of a shape resembling the numeral "8" with a first sleeve forming a fish-eye hole for receiving a screw which locks the connecting fastening ring to a through hole of a mobile phone to connect the circuits, and a second sleeve forming a screw hole for receiving the antenna clamping pawl tube element. The retractable antenna includes a main tube having a signal collector at its top end, and an auxiliary rod element having a stop bolt at its bottom end and fitted together with the main tube. After the retractable antenna is passed through the antenna clamping pawl tube element, it is fitted with a fine tube which is in turn fitted with the outer tube. The outer tube is adhered to the mobile phone by adhering means. When the mobile phone is in use, the retractable antenna may be pulled upwardly, and the stop bolt of the auxiliary rod element rises to where the antenna clamping pawl tube element is, causing pawl portions thereof stretch outwardly to urge against the wall of the fine tube, whereby the rear end of the antenna may be secured while the main tube may be pulled upwardly to reach an optimum signal reception state. By means of the gain structure of the present invention, mobile phone communication quality may be enhanced.

2 Claims, 5 Drawing Sheets

GAIN STRUCTURE OF ANTENNAE OF MOBILE PHONES

BACKGROUND OF THE INVENTION (a) Field of the Invention

The present invention relates to a gain structure of antennae of mobile phones, and more particularly to a structure in which a retractable antenna is further provided at one side of a mobile phone to enhance the transmission and reception of signals.

(b) Description of the Prior Art

Mobile phones are very popular nowadays. The quality of communication via mobile phones depends, apart from the communication networks provided by telecommunications companies, the quality of signal transmission and reception of the mobile phone itself. FIG. 1 shows a schematic view of a mobile phone with a conventional antenna. The mobile phone is provided with a retractable or fixed type antenna to enhance signal reception effects. Due to physical relief or the design of the antenna itself, signal reception of mobile phones is not very satisfactory.

SUMMARY OF THE INVENTION

A primary object of the present invention is to provide a gain structure of antennae of mobile phones to improve the drawbacks with the prior art.

According to the present invention, the gain structure comprises a retractable antenna, an antenna clamping pawl tube element, a connecting fastening ring, and an outer tube. The connecting fastening ring is a double-sleeve tubular element of a shape resembling the numeral "8" with a first sleeve forming a fish-eye hole for receiving a screw which locks the connecting fastening ring to a through hole of a mobile phone to connect the circuits, and a second sleeve forming a screw hole for receiving the antenna clamping pawl tube element. The retractable antenna includes a main tube having a signal collector at its top end, and an auxiliary rod element having a stop bolt at its bottom end and fitted together with the main tube. After the retractable antenna is passed through the antenna clamping pawl tube element, it is fitted with a fine tube which is in turn fitted with the outer tube. The outer tube is adhered to the mobile phone by adhering means. When the mobile phone is in use, the retractable antenna may be pulled upwardly, and the stop bolt of the auxiliary rod element rises to where the antenna clamping pawl tube element is, causing pawl portions thereof stretch outwardly to urge against the wall of the fine tube, whereby the rear end of the antenna may be secured while the main tube may be pulled upwardly to reach an optimum signal reception state. By means of the gain structure of the present invention, mobile phone communication quality may be enhanced.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
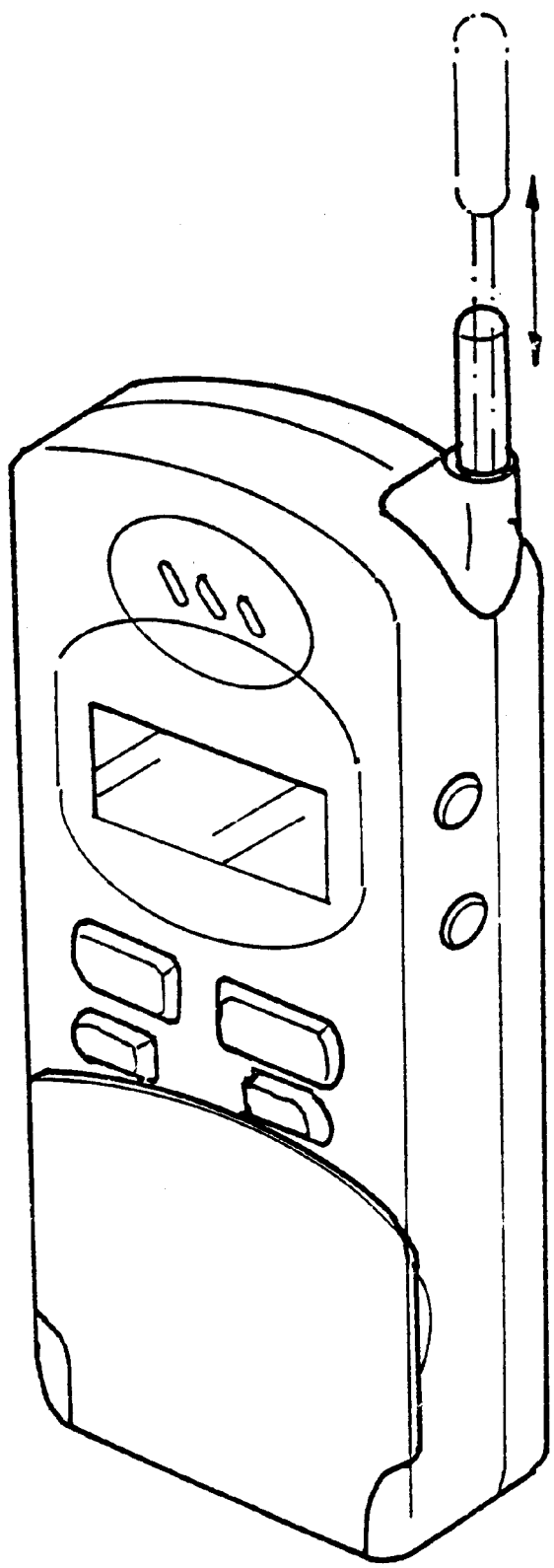
FIGS. 1 and 2 are schematic view of a mobile phone with conventional antenna structure.
Figure 2:
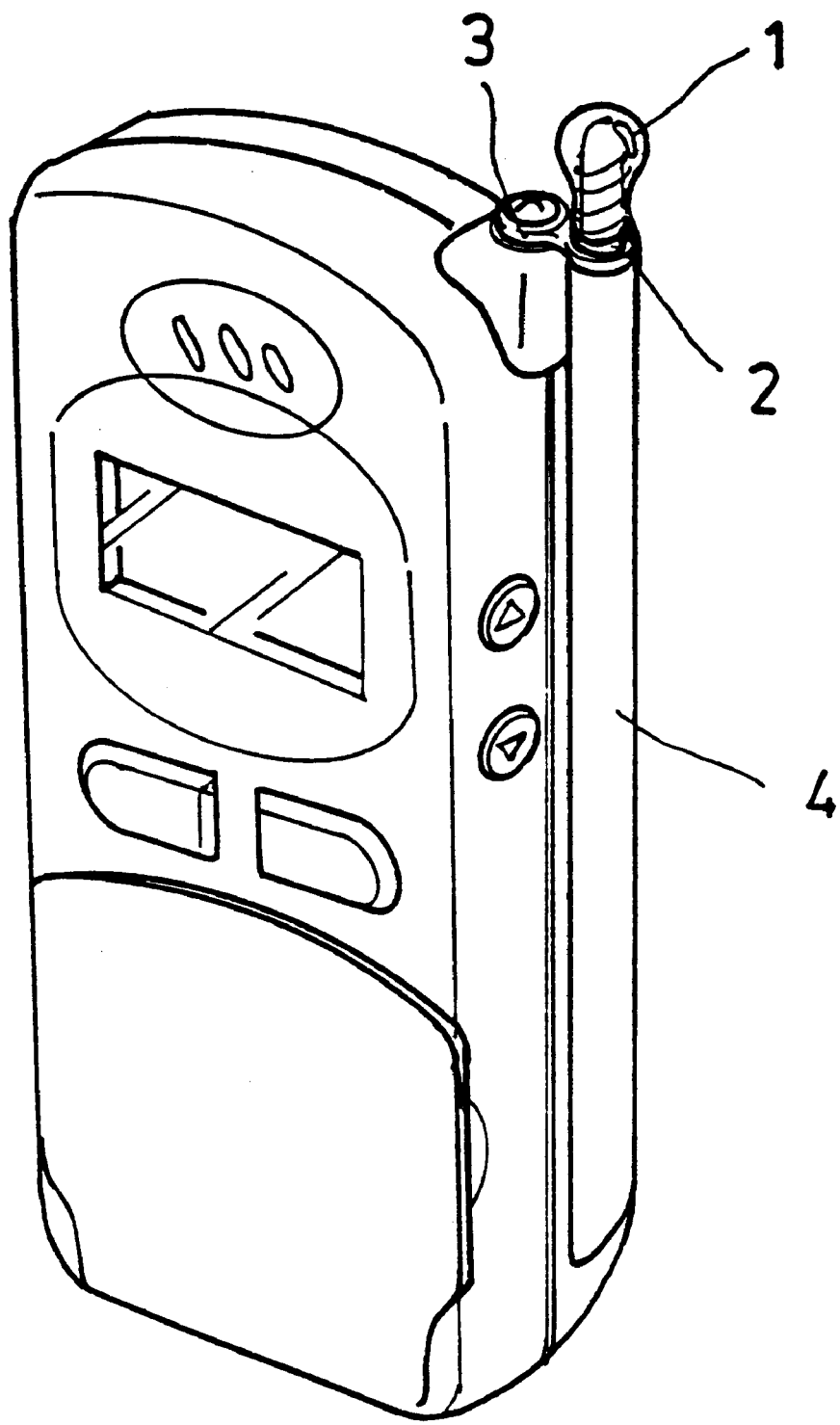
Figure 3:
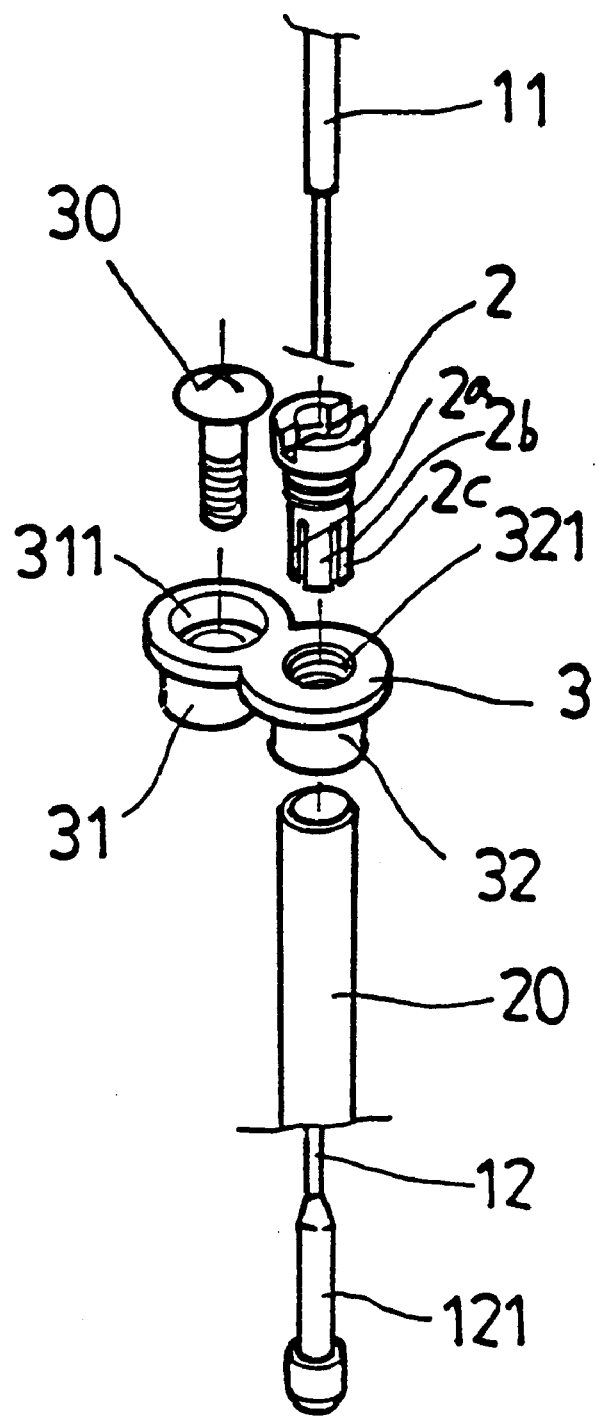
FIG. 3 is an enlarged view of the present invention.
Figure 4:
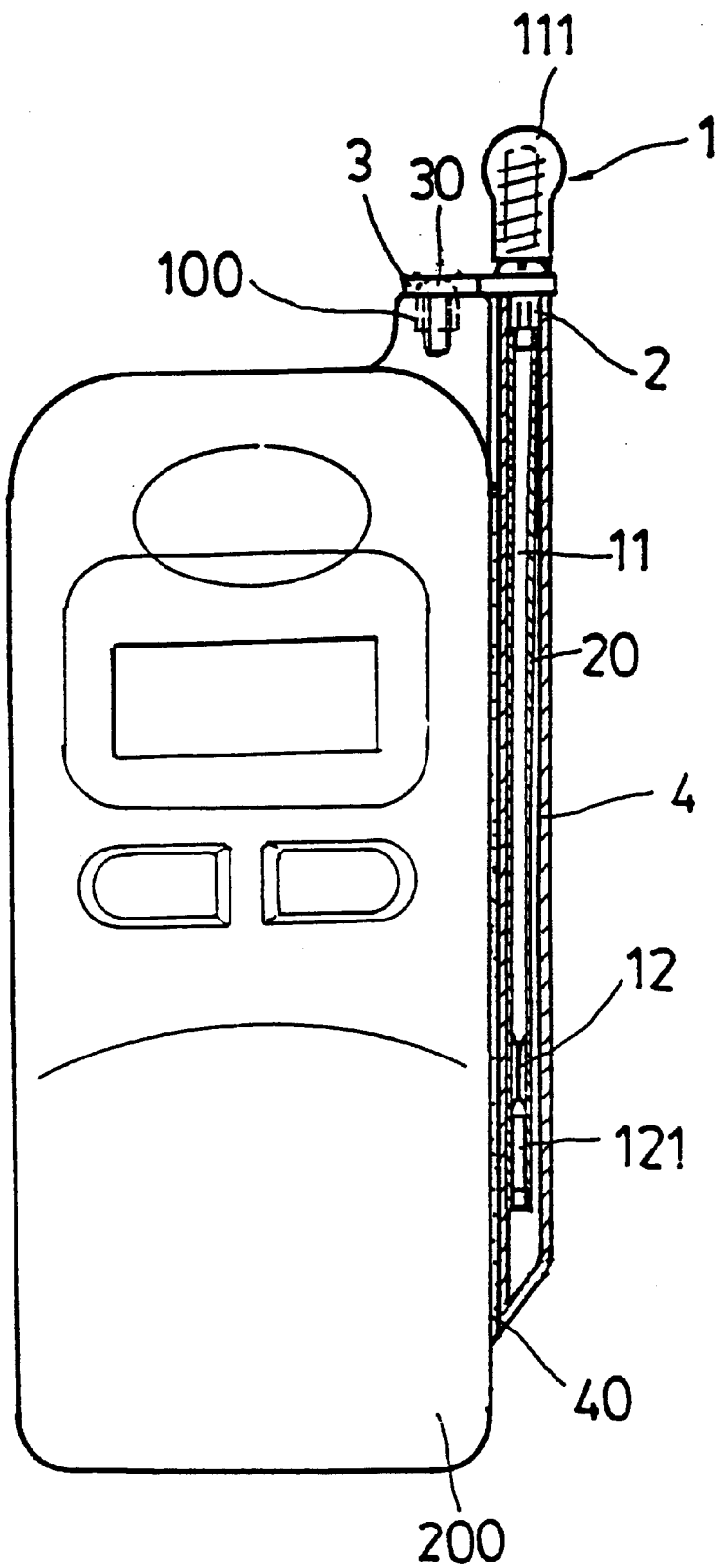
FIG. 4 is a schematic side view of the present invention.
Figure 5A:
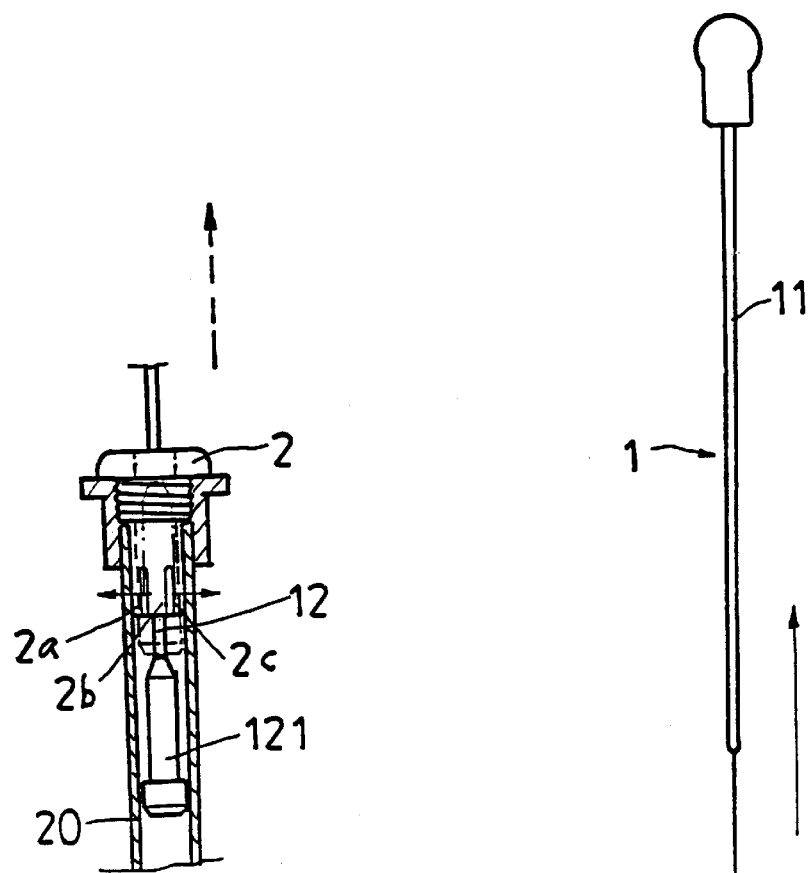
FIG. 5A is an enlarged view illustrating operation of the pawl portions of the present invention.
Figure 5:
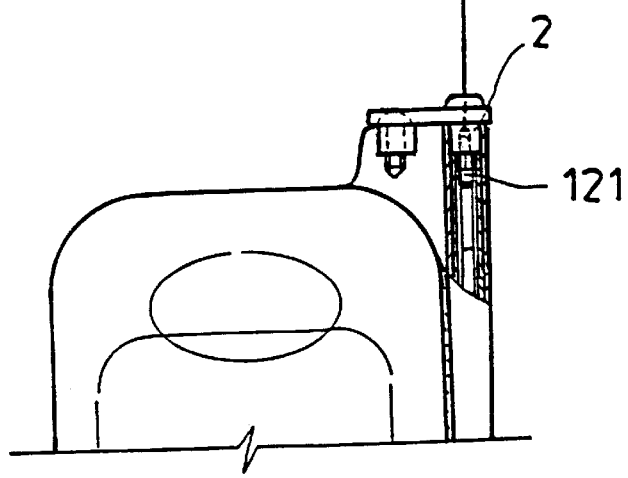
FIG. 5 is a schematic view illustrating operation of the present invention.

With reference to FIGS. 2, 3, and 4, which are respectively the perspective, enlarged and side views of the present invention, it can be seen that the gain structure of antennae of mobile phones comprises a retractable antenna, an antenna clamp pawl tube element 2, a connecting fastening ring 3, and an outer tube 4. The connecting fastening ring 3 is a double-sleeve element of a shape resembling the numeral "8". A first sleeve 31 forms a fish-eye hole 311 for receiving a screw 30, while a second sleeve 32 forms a screw hole 321 for receiving the antenna clamping pawl tube element 2. The screw 30 locks the connecting fastening ring 3 to a through hole 100 of the antenna of the mobile phone to connect the circuits. The antenna clamping pawl tube element 2 is a centrally hollowed-out screw structure having a plurality of slits at a bottom portion thereof which form pawl portions 2a, 2b, 2c,. . . . The retractable antenna 1 includes a main tube body 11 having a signal collector 111 at a top end thereof, and an auxiliary rod element 12 having a stop bolt 121 at a bottom portion thereof fitted with the main tube body 11. After the retractable antenna 1 is fitted through the antenna clamping pawl tube element 2, a fine tube 20 is fitted over the retractable antenna 1 and is in turn fitted with the outer tube 4 externally. The outer tube 4 is adhered to a telephone body 200 by means of an adhering means 40. Referring to FIG. 5, in use, the retractable antenna 1 is pulled upwardly, and the main tube body 11 and the auxiliary rod element 12 may also extend therewith. When the stop bolt 121 at the bottom of the auxiliary rod element 12 rises to the antenna clamping pawl tube element 2, the pawl portions 2a, 2b, 2c, . . . extend outwardly to urge against the wall of the fine tube 20 so that the distal end of the retractable antenna 1 may be secured. In the present invention, the extension of the antenna is utilized to achieve enhanced transmission and reception so as to raise the quality of mobile phones.

Although the present invention has been illustrated and described with reference to the preferred embodiment thereof, it should be understood that it is in no way limited to the details of such embodiment but is capable of numerous modifications within the scope of the appended claims.

What is claimed is:

1. A gain structure of antennae of mobile phones, comprising a retractable antenna, an antenna clamping pawl tube element, a connecting fastening ring, and an outer tube, wherein said connecting fastening ring is a double-sleeve tubular element of a shape resembling the numeral "8" with a first sleeve forming a fish-eye hole for receiving a screw and a second sleeve forming a screw hole for receiving said antenna clamping pawl tube element, said screw locking said connecting fastening ring to a through hole of an antenna of a mobile phone to connect the circuits; said antenna clamping pawl tube element is a centrally hollowed screw-shaped element having a plurality of slits provided at a bottom portion thereof forming pawl s; and said retractable antenna includes a main tube having a signal collector at a top end thereof and an auxiliary rod element provided with a stop bolt at a bottom portion thereof and fitted with said main tube, a fine tube being fitted over said retractable antenna after said retractable antenna is passed through said antenna clamping pawl tube element, said fine tube being externally fitted with said outer tube, which is adhered to the mobile phone by an adhering means, whereby said retractable antenna may be pulled upwardly when in use, and when said stop bolt of said auxiliary rod element rises to said antenna clamping pawl tube element, said pawl portions extend outwardly to urge against the wall of said fine tube so that the rear end of said antenna may be secured while said main tube may be pulled upwardly to achieve optimum signal reception.

2. The gain structure as defined in claim 1, wherein said adhering means may be double-sides adhesive tapes or their equivalents.

* * * * *